Nov. 1, 1960 P. C. NEILSEN 2,958,118
DISK TYPE RASP
Filed June 18, 1956 3 Sheets-Sheet 1
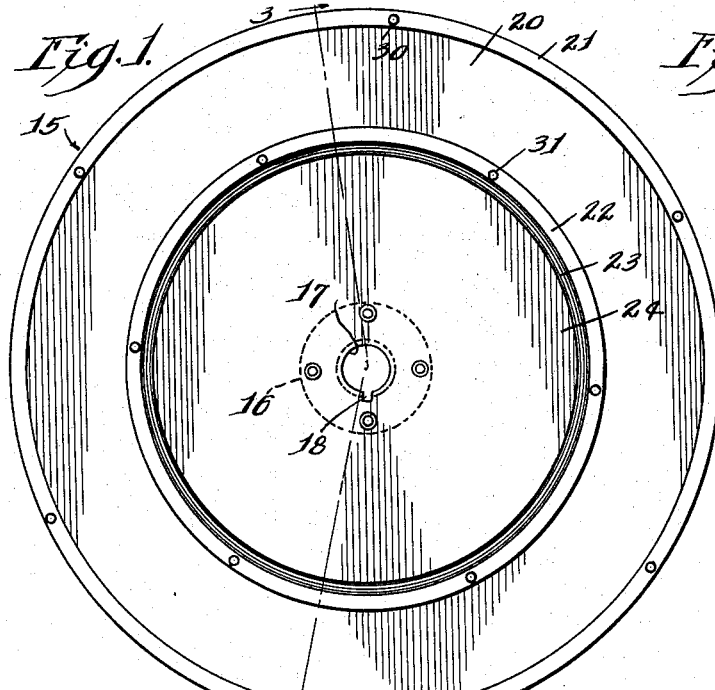
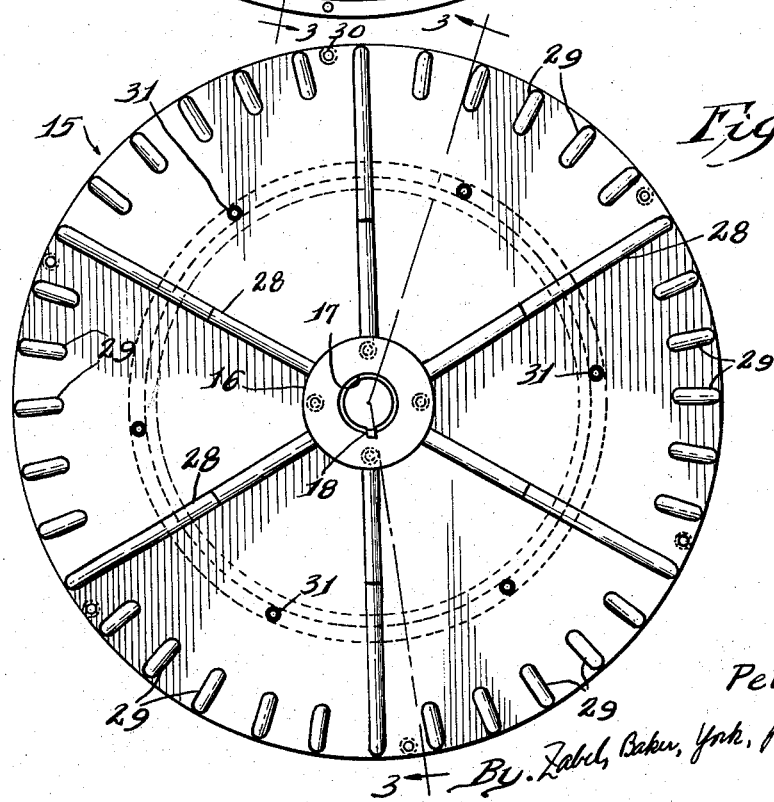
Inventor:
Peter C. Neilsen.
By Zabel, Baker, York, Jones & Dithmar
Attorneys.

Inventor
Peter C. Neilsen

Nov. 1, 1960     P. C. NEILSEN     2,958,118
DISK TYPE RASP
Filed June 18, 1956     3 Sheets-Sheet 3
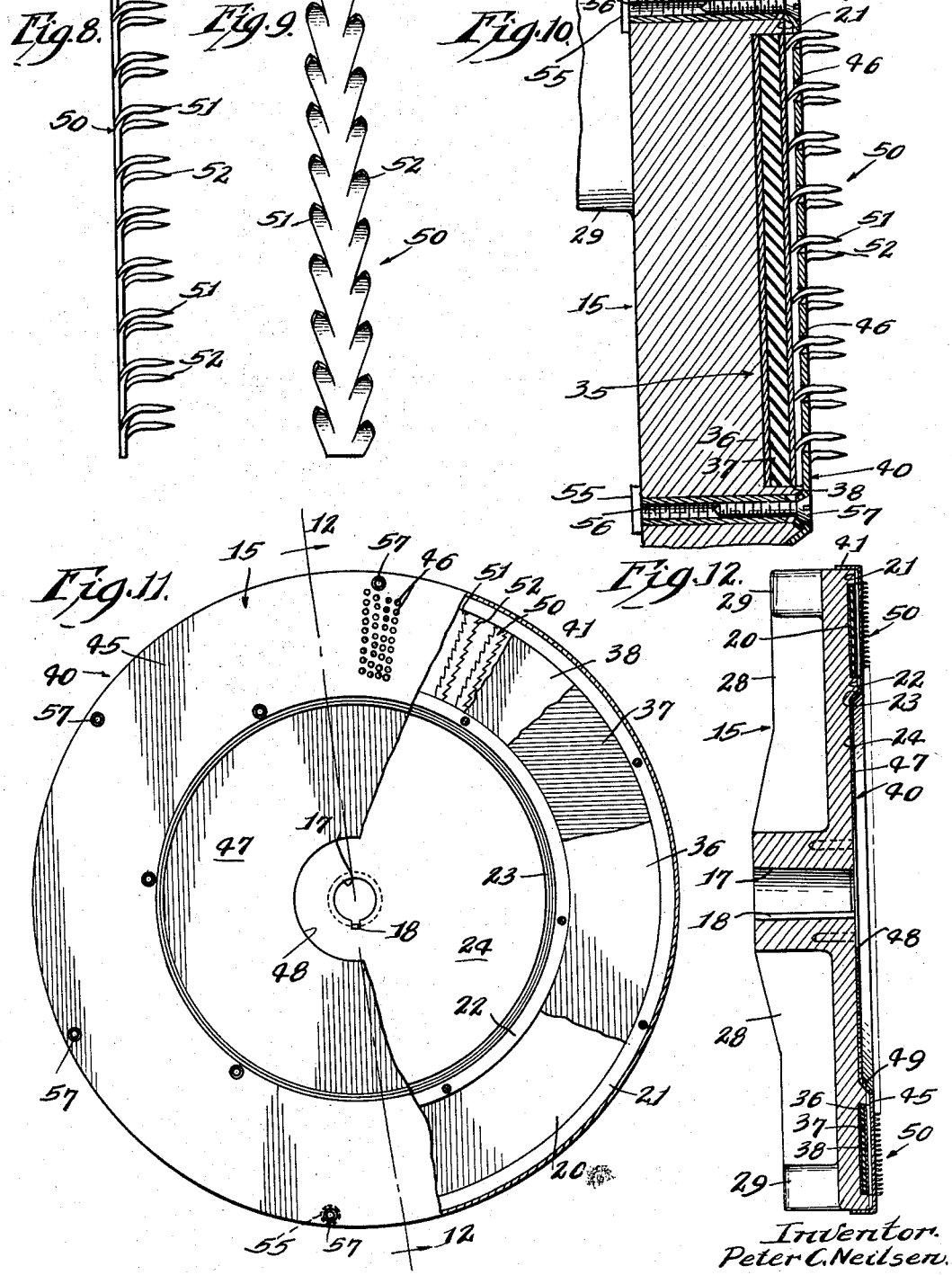
Inventor.
Peter C. Neilsen.
By Zabel, Baker, York, Jones & Dithmar
Attorneys.

United States Patent Office 2,958,118
Patented Nov. 1, 1960

2,958,118

DISK TYPE RASP

Peter C. Neilsen, Neilsen Products Co., Lake Elmo, Minn.

Filed June 18, 1956, Ser. No. 592,024

1 Claim. (Cl. 29—78)

This invention relates to a disk type rasp designed especially for relatively heavy rasping or buffing operations.

The present rasp is suitable for numerous and different rasping or buffing operations, but it is contemplated that the rasp will have particular utility in the field of buffing tires for balancing or re-capping.

The present disk type rasp is disclosed in a general way but not claimed in my copending U.S. patent application for Tire Buffing Machine, Serial No. 592,099, filed June 18, 1956, now Patent No. 2,888,065.

In the field of rasping or buffing tires for balancing or re-capping, most commercial practices at the present time involve the use of drum or cylindrical type rasps. These rasps are effective to a degree, but they possess some shortcomings which heretofore necessarily have been tolerated due to the absence of a rasp which provides improved results. For example, tires buffed by drum or cylindrical type rasps exhibit a certain amount of grooving, roughness and gouging, conditions which frequently cause gas or air pockets to form between the tire carcass and the applied tread stock. Such pockets tend to cause tread separation in time, often in a relatively short time after re-capping.

One reason for the grooving, roughness and gouging inherent in the drum or cylindrical type rasp is that the cutting points or teeth must be spaced relatively far apart if rapid removal of rubber is to be accomplished in reasonable time. Closer spacing of the cutting points or teeth, such as might avoid grooving, roughness and gouging, is accompanied in use by excessive heat so that glazing occurs, a condition which also prohibits the tread stock from adhering properly. Also, close tooth spacing slows cutting speed as the action of such a rasp is similar to that of a wire brush.

One object of this invention is to provide a disk type rasp wherein the cutting points or teeth may be spaced farther apart than is possible with a drum or cylindrical type rasp, and provide an improved buff which has fine texture and is free from objectionable grooving, roughness and gouging.

Another object of the invention is to provide a disk type rasp wherein several rows of teeth simultaneously engage the tire or other work, thereby easing strain and wear on the rasp teeth. In some rasping operations all of the teeth engage the work as the rasp is rotated.

Another object of the invention is to provide a rasp capable of buffing tires to a sufficiently fine texture that considerably less cement is required to secure the tread stock to the tire carcass, compared with the amount of cement required when buffing has been performed with a drum or cylindrical type rasp with its consequent grooving, roughness and gouging.

Still another object of the invention is to provide a disk type rasp wherein a considerably larger number of teeth are used in the rasp compared with the number used in the drum or cylindrical type rasp. This increased number of teeth prolongs the life of the rasp as limited by the sharpness of the teeth, thereby prolonging the periods between which the rasp must be taken out of service and provided with replacement teeth.

A characteristic of one form of teeth used in rasps of this general type is that they have cutting sharpness on both the leading and trailing edge of a blade of such teeth. Consequently a disk type rasp may be rotated in one direction until the leading edge teeth are dulled, after which the rasp can be rotated in the opposite direction to present sharpened, formerly trailing, teeth edges to the work.

An object and advantage of the present disk type rasp is that the rasp motor merely has to be reversed in order to change from one group of teeth edges to the other, compared with the drum or cylindrical type rasp which has to be removed and inverted with respect to its rotating arbor. The latter, of course, means time lost on the equipment using the rasp.

Other objects, advantages and details of the invention will be apparent as the description proceeds, reference being had to the accompanying drawings wherein one form of the invention is shown. It is to be understood that the description and drawings are illustrative only and that the scope of the invention is to be measured by the appended claim.

In the drawings:

Fig. 1 is a front elevational view of a base plate forming one component of the illustrated disk type rasp embodying the invention;

Fig. 2 is a rear elevational view of the base plate shown in Fig. 1;

Fig. 3 is a sectional view on lines 3—3 of Figs. 1 and 2;

Fig. 8 is a side elevational view of one form of cutting points or teeth which may be used in the invention, the form being designated as a toothed blade;

Fig. 9 is a plan view of the toothed blade shown in Fig. 8;

Fig. 10 is a fragmentary sectional view showing a toothed blade mounted in a rasp;

Fig. 11 is a front elevational view of a disk type rasp embodying the invention, portions being broken away to illustrate the assembled relationship of the respective components, and Fig. 12 is a sectional view on line 12—12 of Fig. 11.

Figure 4:
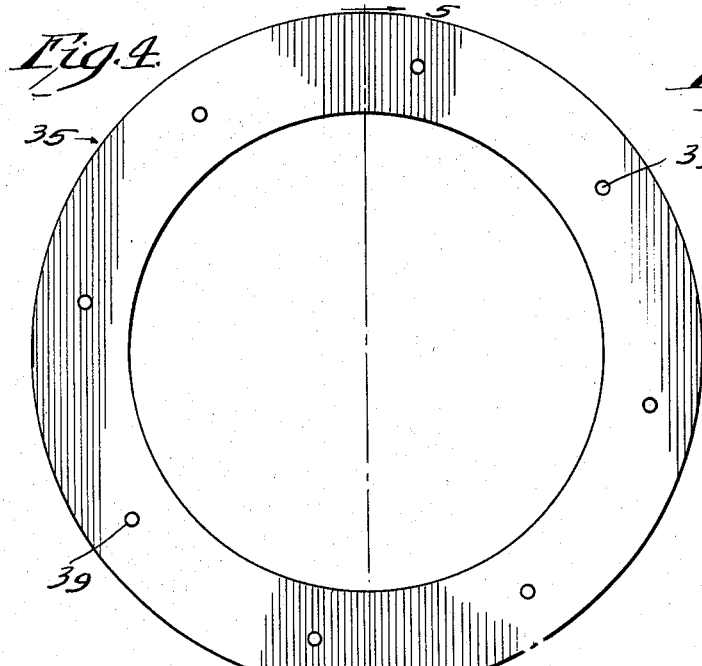
Fig. 4 is a front elevational view of a back-up plate used in the invention.

Referring now to the drawings, Figs. 1–3 illustrate a base plate 15 which may be a machined casting. As shown, base plate 15 is circular, and it is provided with a central mounting hub 16. A central opening 17 is provided in hub 16 for mounting the rasp on a rotating arbor (not shown), the opening 17 preferably being tapered to cooperate with a tapered arbor. A groove 18 is provided in opening 17 to key the rasp to the arbor.

A radially outer annular recess 20 is provided in the front face of base plate 15. As best shown in Fig. 3, recess 20 occupies substantially the outer one-third of the radius of base plate 15, the recess being spaced from the plate periphery by an annular flange 21. The inner margin of recess 20 is defined, as here shown, by an annular flange 22, the inner side of which is tapered as shown at 23. The front face of base plate 15 thus has a central circular recess 24.

Referring to Figs. 2 and 3, the rear face of base plate 15 has a plurality of radial fins, some of which extend from the periphery of the plate to hub 16 and others of which extend from the periphery for only a short distance toward the hub. Thus, there are six equally spaced long fins 28 which extend from the periphery to hub 16, and five equally spaced short fins 29 between each pair of adjacent long fins 28. These fins serve as blower vanes to exhaust cuttings from the vicinity of the rasp, the rasp normally being enclosed in a housing connected to a suction exhaust. The several fins create a draft which transports the cuttings within the housing to the point therein where they are further transported by the suction exhaust.

The respective flanges 21 and 22 of base plate 15 are provided with spaced mounting holes. The radially outer flange 21, as illustrated, has six axially parallel holes 30, while inner flange 22 has six axially parallel holes 31. These holes, as will be seen, cooperate to secure other components of the rasp to base plate 15.

Figure 5:
Fig. 5 is a sectional view on line 5—5 of Fig. 4.

Referring now to Figs. 4 and 5, another element of the invention is an axially resilient annular back-up plate 35. The radial dimension of back-up plate 35 is such that it fits within annular recess 20 on the front face of base plate 15. The sectional view, Fig. 5, is somewhat exaggerated in axial direction to illustrate the three elements which comprise back-up plate 35 in preferred form.

As shown in Fig. 5, the numeral 36 designates an annular ring of thin, mild steel; the numeral 37 designates an annular ring of flexible or resilient material such as molded rubber, and the numeral 38 designates a thin ring of tempered spring steel. The three rings are assembled with rubber ring 37 between the two steel rings 36 and 38, as shown in Fig. 5. Rivets 39 (Fig. 4) or the like may be used to secure the three rings together. Use of a back-up ring 35 is desirable, and it has been found particularly advantageous in rasps intended for heavy buffing. It insures, as will be seen, a securely clamped relationship for the rasp elements presently to be described.

Figure 6:
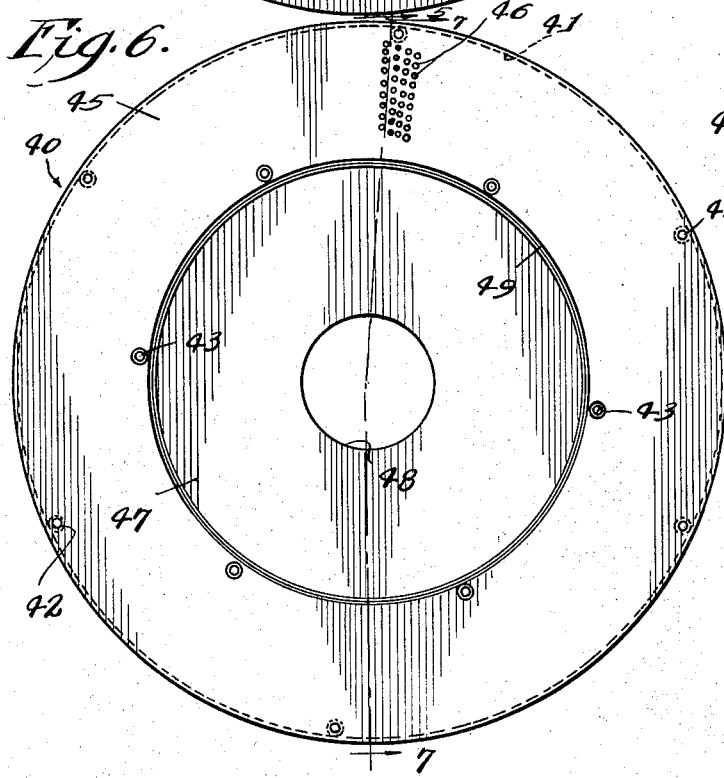
Fig. 6 is a front elevational view of a mounting plate used in the illustrated form of the invention.
Figure 7:
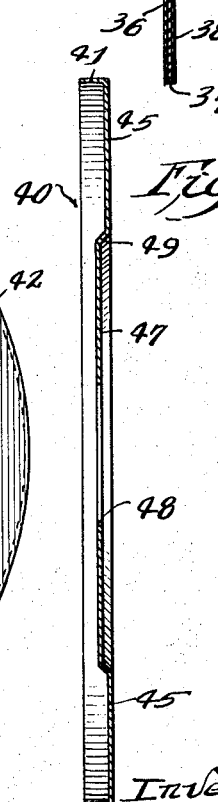
Fig. 7 is a sectional view of line 7—7 of Fig. 6.

Figs. 6 and 7 illustrate a mounting plate 40 which is detachably secured to the front face of base plate 15 and is generally coextensive therewith. Mounting plate 40, sometimes referred to as a grill, is a part which may be formed by a spinning or stamping process. Mounting plate 40 preferably has a peripheral annular flange 41 which embraces the periphery of base plate 15. Mounting holes 42 and 43 are provided in mounting plate 40 in register with the holes 30 and 31, respectively, of base plate 15. The aforesaid radially outer recess 20 in base plate 15 could, if desired, be formed in mounting plate 40 in which case mounting plate would be of increased thickness.

Radially outer annular portion 45 of mounting plate 40 is provided with radially spaced rows of apertures 46, the apertures in adjacent rows being staggered, as best shown in Fig. 6. As will be seen, headed rasp elements extend through apertures 46 with the heads thereof secured between the rear surface of mounting plate 45 and resilient back-up plate 35 or base plate 15, as the case may be. Mounting plate 40 is provided with a central recess 47 corresponding with central recess 24 in base plate 15, there being a central opening 48 to pass the arbor end. The radially outer marginal portion of recess 47 is tapered as shown at 49 to register with the taper 23 on base plate 15.

Figs. 8 and 9 illustrate a toothed blade 50 having two spaced rows of teeth 51 and 52. This blade is described and claimed in my U.S. Patent No. 2,535,088, dated December 26, 1950 and entitled, "Rasp Unit," it being noted that the teeth are staggered as between the two rows.

The disk type rasp of this invention is designed to accommodate as teeth not only the toothed blades 50 but also tacks or staples which are well known in this art as rasp elements. The toothed blades, however, offer numerous advantages and hence use thereof is preferable.

The fragmentary sectional view of Fig. 10 shows a toothed blade 50 mounted in a rasp, the blade being retained between a back-up plate 35 and a mounting plate 40.

An assembled rasp embodying the invention is shown in Figs. 11 and 12. A mounting plate 45 is loaded with rasp elements, i.e. toothed blades, tacks, or staples, and this plate is secured to base plate 15 by means of suitable securing means extending through holes 30 and 31 on base plate 15 and aligned holes 42 and 43 in mounting plate 40. As shown here, the securing means comprise headed inserts 55 which enter base plate 15 from the rear face, the inserts having tapped holes 56 which receive mounting screws 57 which extend through the holes in mounting plate 40.

The heads of the rasp elements are clamped between the spring steel ply of back-up plate 35 and mounting plate 40, the axial resilience of back-up plate 35 being effective to compensate for variations in thickness of the heads of the rasp elements.

When the rasp elements have been dulled on both sides from extended use, the rasp is disassembled and the rasp elements replaced with new ones. When replacing the rasp elements, it is, of course, unnecessary to remove base plate 15 from the arbor of the associated rasp machine.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

A disk type rasp comprising a rigid base plate having a mounting hub at the center, the front face of said base plate having a radially outer annular recess, the rear face of said base plate having circumferentially spaced, radial fins, some of said fins radially long and extending from said hub to the periphery of said plate and other of said fins radially short and terminating at said periphery, an axially resilient annular back-up plate disposed in said recess, a substantially rigid mounting plate detachably secured to the front face of said base plate and generally coextensive therewith, the annular portion of said mounting plate in registry with said recess having radially spaced rows of apertures, the apertures in adjacent rows being staggered, headed rasp elements extending through said apertures with the heads thereof secured between said mounting plate and said back-up plate, and spaced means securing said mounting and base plates together at the annular portions of the base plate adjacent both margins of said recess, said base plate portions engaging said mounting plate, said radially outer annular recess having a depth whereby the heads of said headed rasp elements are tightly clamped between said back-up plate and said mounting plate, the said radial fins effective during rasp operation to create a draft which draws cuttings along the surface of the filling face of the rasp and exhausts them from the vicinity of the rasp.

References Cited in the file of this patent

UNITED STATES PATENTS

| | | |
|---|---|---|
| 1,054,656 | McFeely | Feb. 25, 1913 |
| 1,451,809 | Bell | Apr. 17, 1923 |
| 1,729,881 | Lambert | Oct. 1, 1929 |
| 1,829,531 | Neilson | Oct. 27, 1931 |
| 2,535,088 | Neilson | Dec. 26, 1950 |

FOREIGN PATENTS

| | | |
|---|---|---|
| 697,773 | France | Nov. 5, 1930 |
| 850,660 | France | Sept. 18, 1939 |
| 183,160 | Germany | Apr. 6, 1907 |

UNITED STATES PATENT OFFICE
CERTIFICATE OF CORRECTION

Patent No. 2,958,118                          November 1, 1960

Peter C. Neilsen

It is hereby certified that error appears in the printed specification of the above numbered patent requiring correction and that the said Letters Patent should read as corrected below.

Column 4, line 60, for "filling" read -- filing --.

Signed and sealed this 11th day of April 1961.

(SEAL)
Attest:
ERNEST W. SWIDER                            ARTHUR W. CROCKER
Attesting Officer                                  Acting Commissioner of Patents